US007535924B2

(12) United States Patent
Jeon et al.

(10) Patent No.: US 7,535,924 B2
(45) Date of Patent: May 19, 2009

(54) ADDRESS RESOLUTION PROTOCOL (ARP) PROCESSING METHOD FOR ETHERNET MATCHING

(75) Inventors: Hae Sook Jeon, Daejeon (KR); Tae Il Kim, Daejeon (KR); Hae Won Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 432 days.

(21) Appl. No.: 11/474,547

(22) Filed: Jun. 26, 2006

(65) Prior Publication Data

US 2007/0124486 A1    May 31, 2007

(30) Foreign Application Priority Data

Nov. 30, 2005   (KR) ...................... 10-2005-0115894

(51) Int. Cl.
*H04L 12/54* (2006.01)
(52) U.S. Cl. ..................................... 370/466
(58) Field of Classification Search ................. 370/252, 370/351–356, 400, 401, 465–467, 509; 709/226–229
See application file for complete search history.

(56) References Cited

U.S. PATENT DOCUMENTS

| 6,771,673 | B1 * | 8/2004 | Baum et al. ................. 370/535 |
| 6,888,798 | B2 * | 5/2005 | Jamieson et al. ............ 370/236 |
| 7,002,976 | B2 * | 2/2006 | Dupont ....................... 370/404 |
| 2002/0052972 | A1 | 5/2002 | Yim | |
| 2004/0174872 | A1 | 9/2004 | Kondapalli et al. | |

FOREIGN PATENT DOCUMENTS

| JP | 2001-268108 | 9/2001 |
| KR | 1020050013709 | 2/2005 |
| KR | 1020050013710 | 2/2005 |
| KR | 10-20050058624 | 6/2005 |
| KR | 1020050081113 | 8/2005 |

* cited by examiner

*Primary Examiner*—Wing F Chan
*Assistant Examiner*—Duc T Duong
(74) *Attorney, Agent, or Firm*—Ladas & Parry LLP

(57) ABSTRACT

An address resolution protocol (ARP) processing method for Ethernet matching is provided in which a message authentication code (MAC) request message including IP information is received from another application module and provides a MAC corresponding to the MAC request message, the method including: determining whether a MAC matching the IP information included in the MAC request message is stored; determining whether the MAC request message includes Ethernet over synchronous optical network/synchronous digital hierarchy (SONET/SDH) (EoS) channel information; if it is determined that the MAC request message does not include EoS channel information, detecting EoS channel information that is previously stored and that matches the IP information; and broadcasting an ARP request message to an external host via an EoS channel. The ARP processing method is performed using the EoS channel, thereby reducing unnecessary broadcast traffic packets.

11 Claims, 5 Drawing Sheets

FIRST DEVICE                SECOND DEVICE

PORT x                      PORT y

ADDRESS RESOLUTION PROTOCOL (ARP) PROCESSING METHOD FOR ETHERNET MATCHING

BACKGROUND OF THE INVENTION

This application claims the benefit of Korean Patent Application No. 10-2005-0115894, filed on Nov. 30, 2005, in the Korean Intellectual Property Office, the disclosure of which is incorporated herein in its entirety by reference.

1. Field of the Invention

The present invention relates to an address resolution protocol (ARP) processing method for Ethernet matching, and more particularly to, an ARP processing method via an Ethernet over a synchronous optical network/synchronous digital hierarchy (SONET/SDH) (EoS) channel in a network such as the Internet/an Intranet and a LAN in order to reduce unnecessary broadcast traffic packets for Ethernet matching.

2. Description of the Related Art

Owing to the popularization of the Internet, synchronous optical network/synchronous digital hierarchy (SONET/SDH) equipment is required to transmit Internet protocols (IPs). Therefore, methods of transmitting the IPs have been developed using SONET/SDH equipment.

Ethernet provided by IEEE WG 802.3 is a relatively simple and cost-effective technology that connects a LAN and the Internet/an Intranet in personal and public networks. Ethernet messages including IPs are directly applied to the SONET/SDH equipment to reduce expense.

In a 4B/4B or 8B/10B encoding process, an Ethernet physical layer adds 25% overhead to a layer 2 Ethernet stream. The overhead indicates a gap between packets, a preamble, and interframe spacing (IFS) indicating the start of a packet boundary.

The IFS is an overhead of a layer 2 of an adjacent Ethernet message, and does not contain useful information in a bi-directional link. Therefore, the Ethernet message is mapped to SONET, deleted from a node adjacent to the IFS and the physical layer, and reproduced in an end, so that bandwidths can be considerably reduced.

The reduction of bandwidths compensates for a reduction of SONET bandwidths required to transmit the Ethernet message for customers that do not need Ethernet at a line speed. This is called frame mapped generic framing procedure (GFP-F) accessing.

Service providers can provide the SONET bandwidths as options by extending a basic TDM (VT1.5, STS-1, or STS-3c). Customers can obtain desired bandwidths regardless of an Ethernet port speed. As mentioned above, the GFP-F accessing cannot directly move Ethernet to SONET networks.

GFP standards allow GFP-F or GFP-transparent mapping (T) as an Ethernet over SONET/SDH (EoS) channel, whereas GFP-T standards are progressing for an effective transmission at an Ethernet line speed or to a sub rate Ethernet. Service standardization maintains 802.1 and 802.3 Ethernet and deletes encoding of the physical layer, and unnecessary overheads such as the IFS. Standardization of ITU-T and the metro Ethernet forum (MEF) are in progress.

As ITU-T G. 707 SDH standards develop, a virtual concatenation technology that accommodates bit rates of Ethernet LAN service, 10/100/bit/s, 1 Giga/10 Giga bit/s, and enables non-standard SONET/SDH multiplexing to more effectively use bandwidths has been introduced.

The Ethernet physical speed differs from a TDM speed. In order for Ethernet to include SONET, the Ethernet needs to be mapped to a greater amount of Ethernet than the Ethernet. However, such a method requires a lot of SONET transmission consumption.

For example, if 100 Mb/s Ethernet is mapped to the STS-3c (155.52 Mbps), waste of 35% is generated, and if 1 Gb/s is mapped to the STS-48c (2.5 Gbps), waste of 60% is caused. Virtual concatenation (VC) logically groups VT1.5, and obtains SONET bandwidths mapped with the Ethernet speed, thereby reducing the bandwidth consumption. For example, seven STS-3cs are logically bound to carry giga bit Ethernet subscribers using an STS-3c-7v virtual link connected pass.

The ITU-T G.707 explains the advantage presented by SDH and multiplexing, and designates a set of an SDH bit speed, a general policy and message structure of the network node interface (NNI), a whole message size of 9 row ×N×270 column, section overhead (SOH) followed with the byte allocation, an arrangement toward the international interconnection of the synchronization transport module (STM), a format regarding multiplexing and mapping of a device in NNI to STM-N.

SONET is identical to SDH in North America. In optical media, SONET is a US (ANSI) standard for synchronized data transmission. It is guaranteed that a digital network can be internationally interconnected and use the optical media according to existing conventional transmission systems attached by a branch. SONET is an optical carrier level and defines a multiple set of a known base speed and a base speed of 51.84 Mbps.

SONET has an octet synchronization multiple structure defining a standard speed and a group of formats. Standards on single fiber, and multiple mode fabric and CATV 75 ohm coaxial cable are provided. A transmission rate is an integral multiple of 51.840 Mbps and used to transfer a T3/E3 bit synchronization signal. It is strongly recommended to use G,703 E1/E3/E4/T1/T2/T4 interface as the physical layer of IP over SDH/SONET so that users can easily access a LAN.

An Ethernet interface has a MAC address to distinguish discrete hosts over a LAN. The MAC address of each of all Ethernet interfaces has a different value. Therefore, each host can be uniquely distinguished on a local network.

An EoS interface assembles an STS-1 rate that is a basic transmission speed due to a high/low order virtual order VC function and makes a variety of transport sizes. Each VC of the transport sizes is a channel.

Generally, LANs are used to communicate information between terminals using a simple message format in research institutes, companies, etc., having an interest in the matter. Unlike a conventional LAN that is simultaneously accessed by several tens or hundreds of users, broadcast/multicast packets such as ARP requests are frequently generated in a cyber apartment or a multi-tenant unit (MTU) environment that simultaneously accommodates several thousands of users. Therefore, equipment and terminals of the LAN environment must process a lot of packets regardless of the equipment and terminals.

To address the problem, a method of dividing a LAN into a plurality of virtual LANs using a router to prevent degradation of the performance of the LAN according to packets of broadcast traffic has recently been popularized.

SUMMARY OF THE INVENTION

The present invention provides an address resolution protocol (ARP) processing method for Ethernet matching that transports ARP broadcasting or an ARP response message via an Ethernet over a synchronous optical network/synchronous digital hierarchy (SONET/SDH) (EoS) channel and reduces unnecessary broadcast traffic packets.

According to an aspect of the present invention, there is provided an address resolution protocol (ARP) processing method that receives a message authentication code (MAC) request message comprising IP information from another/other application modules and provides a MAC corresponding to the MAC request message, the method comprising: (a) determining whether a MAC matching the IP information included in the MAC request message is stored; (b) if it is determined that the MAC is not stored, determining whether the MAC request message comprises Ethernet over synchronous optical network/synchronous digital hierarchy (SONET/SDH) (EoS) channel information; (c) If it is determined that the MAC request message does not comprise EoS channel information, detecting EoS channel information that is previously stored and that matches the IP information; and (d) broadcasting an ARP request message to an external host via an EoS channel of the detected EoS channel information.

According to another aspect of the present invention, there is provided an ARP processing method that receives a MAC request message comprising IP information from an external host and provides a MAC corresponding to the MAC request message, the method comprising: (a) determining whether a MAC matching the IP information included in the MAC request message is stored; (b) If it is determined that the MAC is stored, determining whether the ARP request message and EoS channel information are transported; (c) If it is determined that the ARP request message and the EoS channel information are not transported, detecting EoS channel information that is previously stored and that matches the IP information; and (d) transporting an ARP response message comprising the MAC to the external host via an EoS channel of the detected EoS channel information.

BRIEF DESCRIPTION OF THE DRABLADES

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
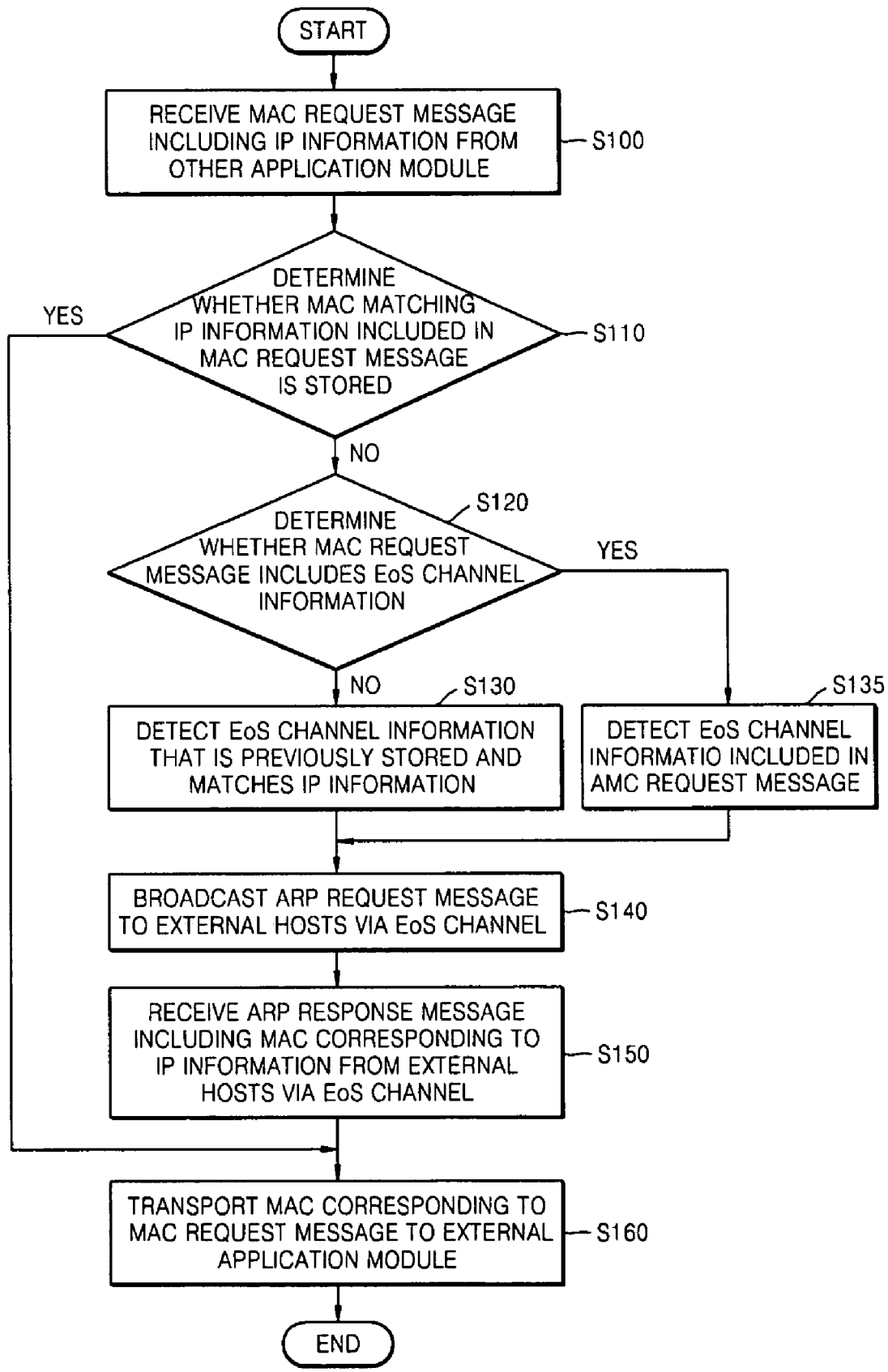
FIG. 1 is a flowchart illustrating a method of providing an address resolution protocol (ARP) for Ethernet matching according to an embodiment of the present invention.

FIG. 1 is a flowchart illustrating a method of providing an address resolution protocol (ARP) for Ethernet matching according to an embodiment of the present invention. Referring to FIG. 1, the method relates to receiving a message authentication code (MAC) request message including IP information from another application module and providing a MAC corresponding to the MAC request message.

The MAC request message including IP information is received from another application module (Operation 100). The MAC request message further includes virtual LAN (VLAN) information.

It is determined whether a MAC matching the IP information included in the MAC request message is stored (Operation 110) based on whether an ARP table includes an ARP entry including MAC information matching the IP information.

When the MAC request message further including the VLAN information is received, it is determined whether a MAC matching the IP information and the VLAN information is stored based on whether an ARP table includes an ARP entry including MAC information matching the IP information and the VLAN information.

If it is determined that the MAC is stored, the MAC corresponding to the MAC request message is transported to an external application module (Operation 160).

If it is determined that the MAC is not stored, it is determined whether the MAC request message includes Ethernet over synchronous optical network/synchronous digital hierarchy (SONET/SDH) (EoS) channel information (Operation 120).

If it is determined that the MAC request message does not include the EoS channel information, EoS channel information that is previously stored and matches the IP information is detected (Operation 130) using a micro block that transports a substantial packet.

If it is determined that the MAC request message includes the EoS channel information, the EoS channel information included in the AMC request message is detected (Operation 135).

An ARP request message is broadcasted to external hosts via an EoS channel of the detected EoS channel information (Operation 140).

An ARP response message including the MAC corresponding to the IP information is received from the external hosts via the EoS channel (Operation 150).

The MAC that is determined to be stored in Operation 110 or the MAC included in the ARP response message received from the external hosts is transported to the external application module (Operation 160).

Figure 2:
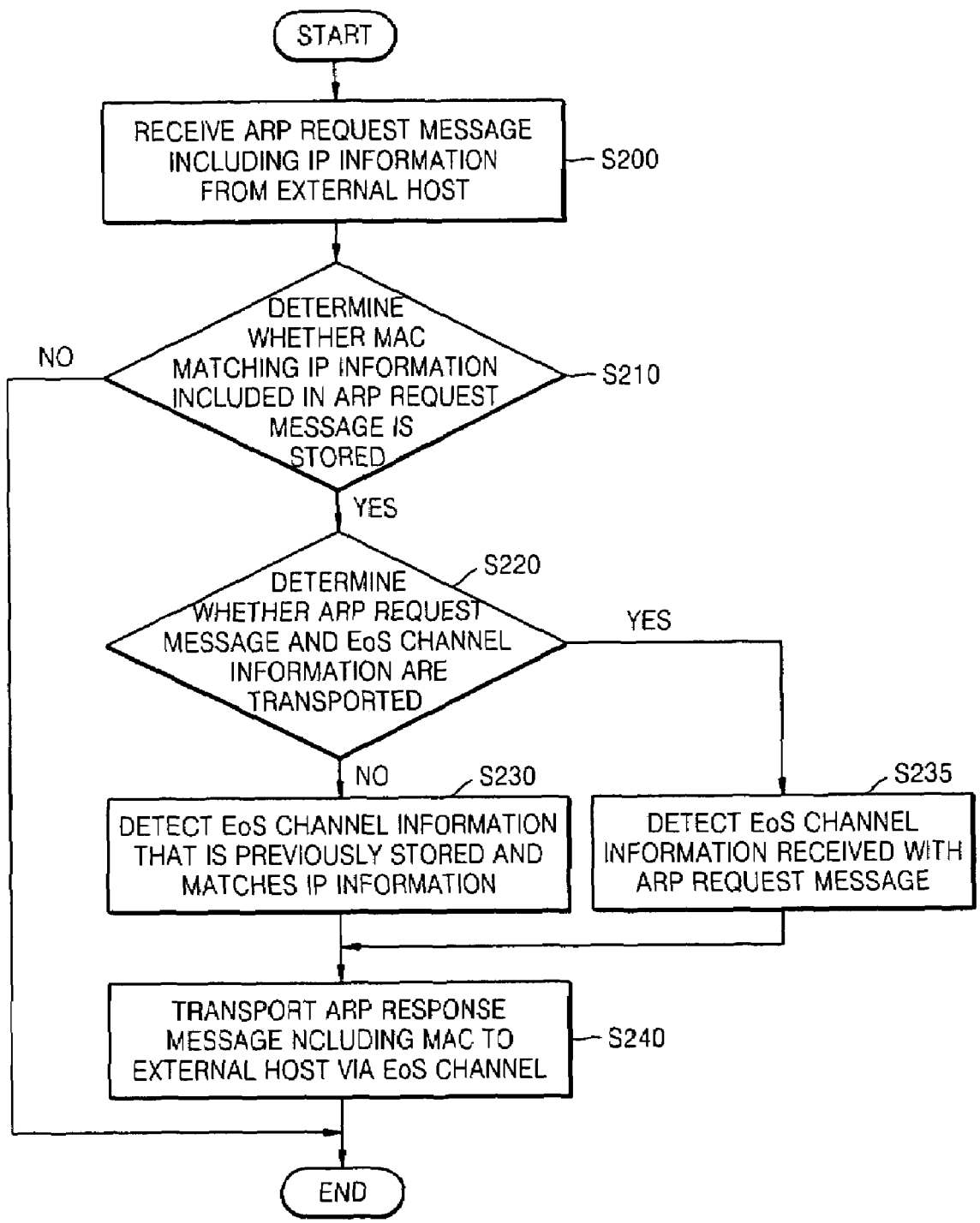
FIG. 2 is a flowchart illustrating a method of providing an ARP for Ethernet matching according to another embodiment of the present invention.

FIG. 2 is a flowchart illustrating a method of providing an ARP for Ethernet matching according to another embodiment of the present invention. Referring to FIG. 2, in the method, an ARP request message including IP information is received from an external host and a MAC corresponding to the ARP request message is provided.

The ARP request message including the IP information is received from the external host (Operation 200). The ARP request message further includes VLAN information.

It is determined whether a MAC matching the IP information included in the ARP request message is stored (Operation 210) based on whether an ARP table includes an ARP entry including MAC information matching the IP information.

When the ARP request message further including the VLAN information is received, it is determined whether a MAC matching the IP information and the VLAN information is stored based on whether an ARP table includes an ARP entry including MAC information matching the IP information and the VLAN information.

If it is determined that the MAC is not stored, the operation ends.

If it is determined that the MAC is stored, it is determined whether the ARP request message and EoS channel information are transported (Operation 220).

If it is determined that the ARP request message and the EoS channel information are transported, EoS channel information that is previously stored and matches the IP information is detected (Operation 230).

If it is determined that the ARP request message and the EoS channel information are transported, the EoS channel information is detected (Operation 235).

An ARP response message including the MAC is broadcasted to the external host via an EoS channel of the detected EoS channel information (Operation 240).

Figure 3:
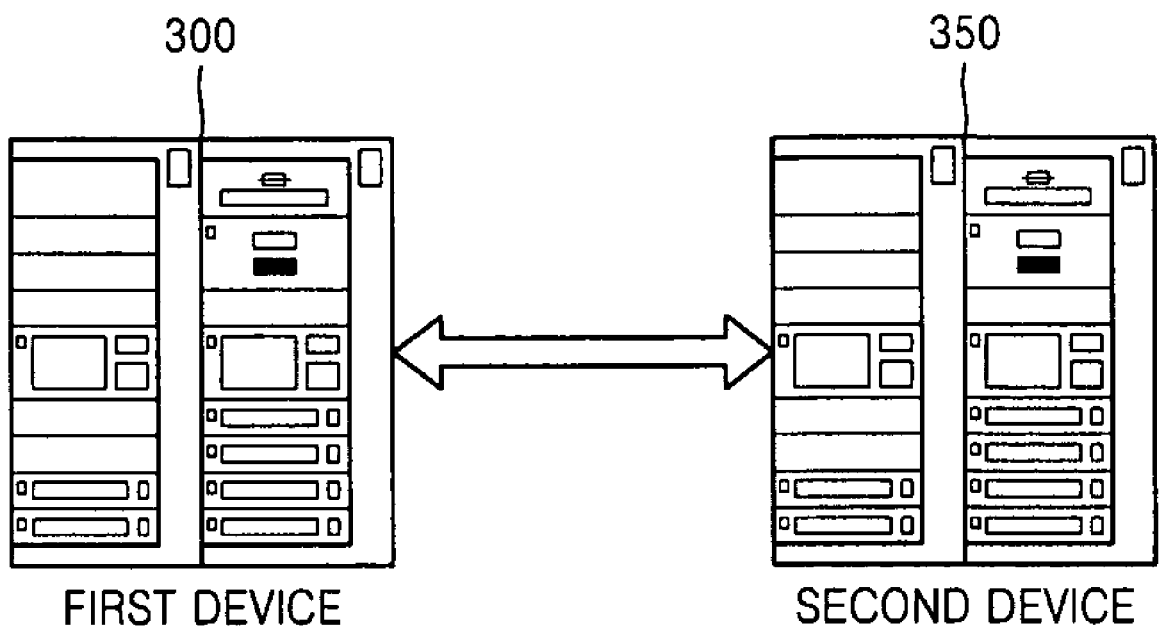
FIG. 3 illustrates Ethernet over synchronous optical network/synchronous digital hierarchy (SONET/SDH) (EoS) channels applied to the methods illustrated in FIGS. 1 and 2.
Figure 3:
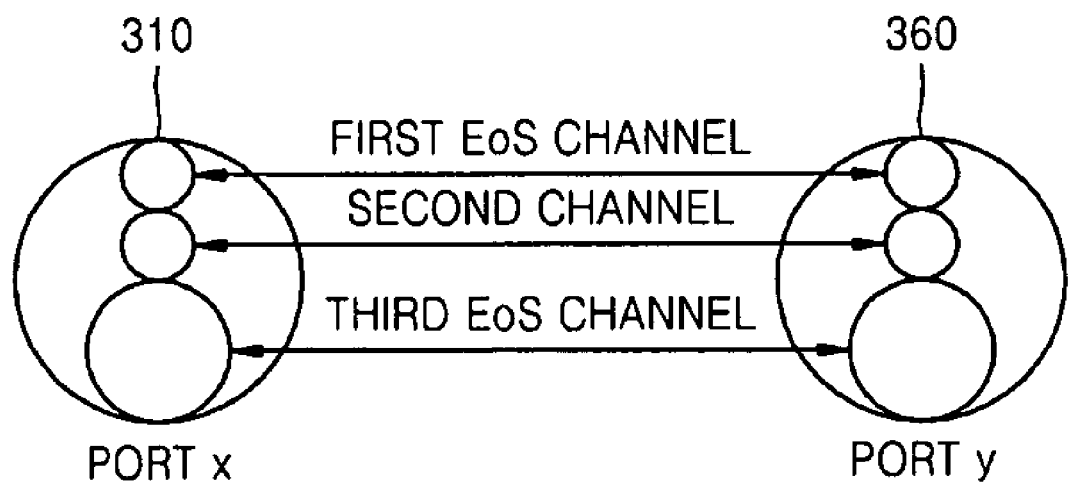

FIG. 3 illustrates EoS channels applied to the methods illustrated in FIGS. 1 and 2. Referring to FIG. 3, when an EoS card is inserted as a router of a network or a line card of an L3 switch, a port includes a plurality of EoS channels.

For example, a port x 310 of a first device 300 and a port y 360 of a second device 350 are connected via a first EoS channel, a second EoS channel, and a third EoS channel.

An ARP process is performed based on EoS channel information including an IP regardless of the existence of a VLAN using the first EoS channel, the second EoS channel, and the third EoS channel.

Figure 4:
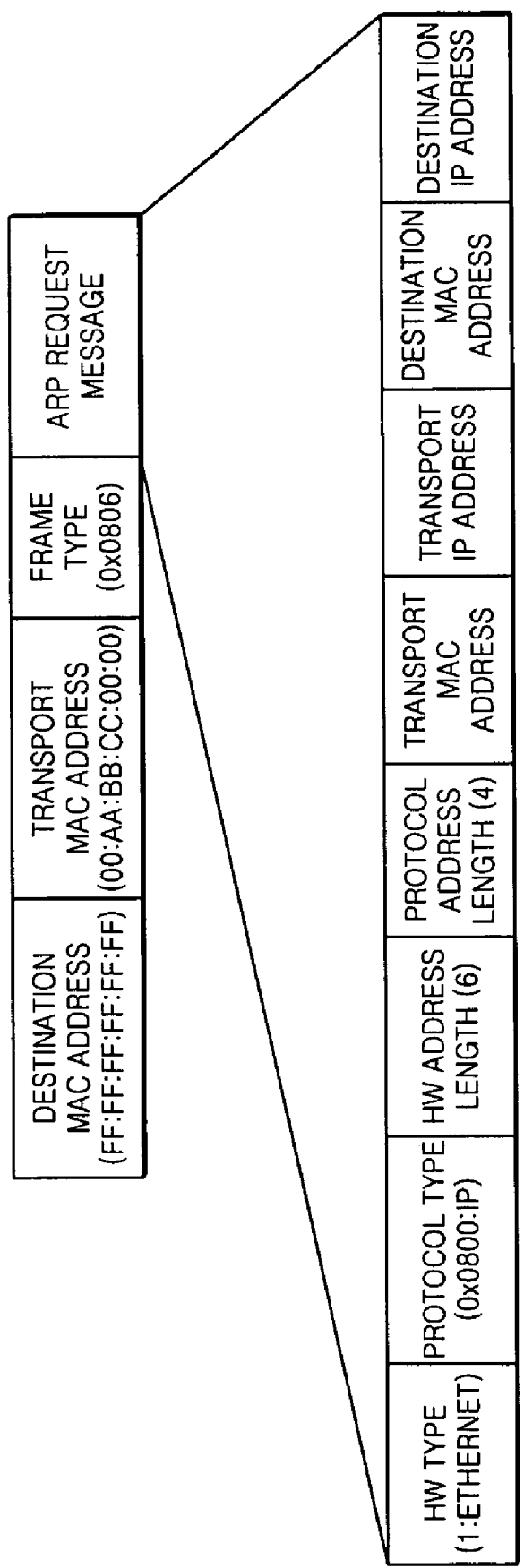
FIG. 4 illustrates an ARP request message applied to the method illustrated in FIG. 1.

FIG. 4 illustrates an ARP request message applied to the method illustrated in FIG. 1. Referring to FIG. 4, the ARP request message is transported to an external host via an EoS channel corresponding to EoS channel information. The ARP request message is transported via the EoS channel but not reflected to a packet. The ARP request message is a general ARP request message.

A message includes a destination MAC address, a transport MAC address, a frame type, and the ARP request message. The destination MAC address sends broadcast 0xffffffff to a receiver to receive all packets. The transport MAC address uses a MAC of a transporter that requests an ARP. The frame type uses 0x0806 indicating an ARP message. The ARP request message includes a HW type in which Ethernet is 1, a protocol type in which an IP is 0x0800, a HW address length that is 6 since the MAC is 6 bytes, a protocol address length that is 4 since an IPv4 address is 4 bytes, an OP code that is 0x1 indicating the ARP request, a transport MAC address that records a MAC 6 bytes of the transporter, a transport IP address that uses a transport IPv4 address, a destination MAC address that is unknown, and a destination IP address.

Figure 5:
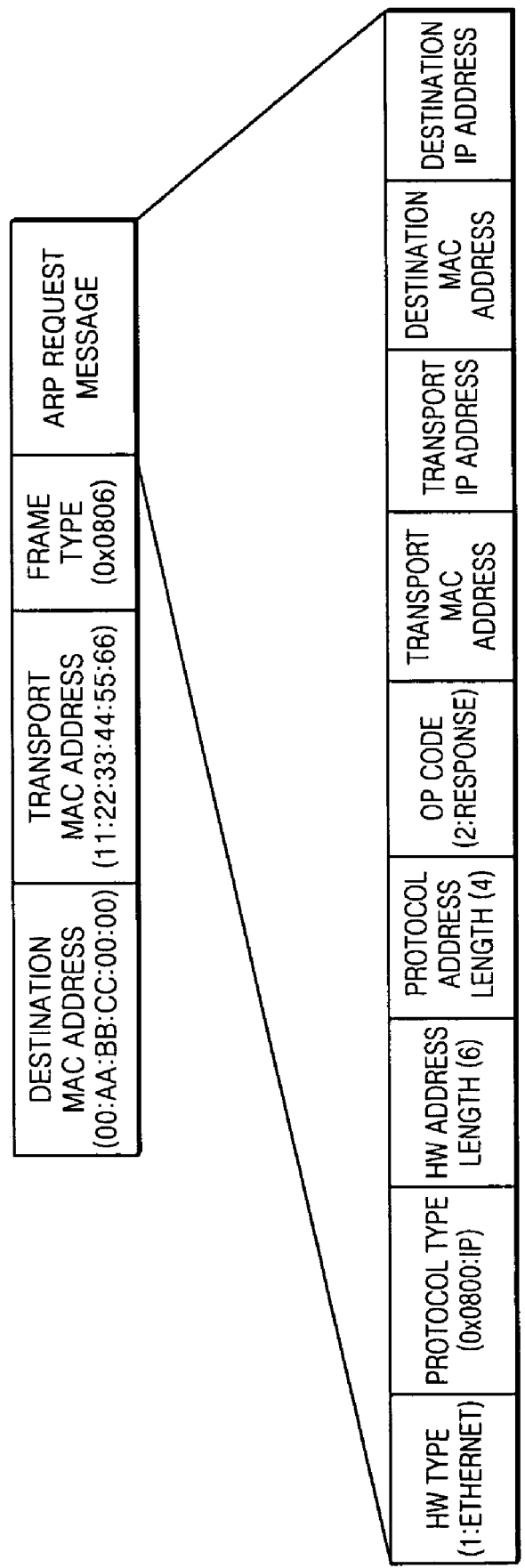
FIG. 5 illustrates an ARP request message applied to the method illustrated in FIG. 2.

FIG. 5 illustrates an ARP request message applied to the method illustrated in FIG. 2. Referring to FIG. 5, the ARP request message is transported to an external host via an EoS channel corresponding to EoS channel information. The ARP request message is transported via the EoS channel but not reflected to a packet. The ARP request message is a general ARP request message.

A message includes a destination MAC address, a transport MAC address, a frame type, and the ARP request message. The destination MAC address uses a source AMC that requests an ARP. The transport MAC address uses a MAC of a transporter that responds to the ARP. The frame type uses 0x0806 indicating an ARP message. The ARP request message includes a HW type in which Ethernet is 1, a protocol type in which an IP is 0x0800, a HW address length that is 6 since the MAC is 6 bytes, a protocol address length that is 4 since an IPv4 address is 4 bytes, an OP code that is 0x2 indicating the ARP response, a transport MAC address that records a MAC 6 bytes of the transporter, a transport IP address that uses a transport IPv4 address, a destination MAC address and a destination IP address that use a value for the ARP request.

According to an embodiment of the present invention, an ARP processing method via an EoS channel in a network such as the Internet/an Intranet and a LAN reduces unnecessary broadcast traffic packets and unnecessary processing of the constituents in a LAN environment.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An address resolution protocol (ARP) processing method that receives a message authentication code (MAC) request message comprising Internet Protocol (IP) information from another/other application modules and provides a MAC corresponding to the MAC request message, the method comprising:
   (a) determining whether a MAC matching the IP information included in the MAC request message is stored;
   (b) if it is determined that the MAC is not stored, determining whether the MAC request message comprises Ethernet over synchronous optical network/synchronous digital hierarchy (SONET/SDH) (EoS) channel information;
   (c) If it is determined that the MAC request message does not comprise EoS channel information, detecting EoS channel information that is previously stored and that matches the IP information; and
   (d) broadcasting an ARP request message to an external host via an EoS channel of the detected EoS channel information.

2. The method of claim 1, further comprising: (c') if it is determined that the MAC request message comprises the EoS channel information, broadcasting the ARP request message to the external host via an EoS channel of the detected EoS channel information.

3. The method of claim 1, wherein, in operation (c), a micro block that transports a substantial packet detects the EoS channel information that is previously stored and that matches the IP information.

4. The method of claim 1, further comprising: (b') if it is determined that the MAC is stored, transporting the MAC to the other application module.

5. The method of claim 1, wherein the ARP request message broadcasted to the external host does not include the EoS channel information.

6. The method of claim 1, wherein operation (a) is performed based on whether an ARP table comprises an ARP entry comprising MAC information matching the IP information.

7. The method of claim 6, wherein the MAC request message further comprises virtual LAN (VLAN) information, and
   operation (a) is performed based on whether an ARP table comprises an ARP entry comprising MAC information matching the IP information and the VLAN information.

8. An address resolution protocol (ARP) processing method that receives a message authentication code (MAC)

request message comprising Internet Protocol (IP) information from an external host and provides a MAC corresponding to the MAC request message, the method comprising:
- (a) determining whether a MAC matching the IP information included in the MAC request message is stored;
- (b) If it is determined that the MAC is stored, determining whether the ARP request message and synchronous optical network/synchronous digital hierarchy (EoS) channel information are transported;
- (c) If it is determined that the ARP request message and the EoS channel information are not transported, detecting EoS channel information that is previously stored and that matches the IP information; and
- (d) transporting an ARP response message comprising the MAC to the external host via an EoS channel of the detected EoS channel information.

9. The method of claim 8, further comprising: (c') if it is determined that the ARP request message and the EoS channel information are transported, detecting the EoS channel information.

10. The method of claim 8, wherein operation (a) is performed based on whether an ARP table comprises an ARP entry comprising MAC information matching the IP information.

11. The method of claim 10, wherein the MAC request message further comprises VLAN information, and operation (a) is performed based on whether an ARP table comprises an ARP entry comprising MAC information matching the IP information and the VLAN information.

* * * * *